No. 664,034. Patented Dec. 18, 1900.
F. H. BECKER.
FURNACE.
(Application filed May 3, 1898.)
(No Model.) 2 Sheets—Sheet 1

Attest
Inventor
Franz H. Becker

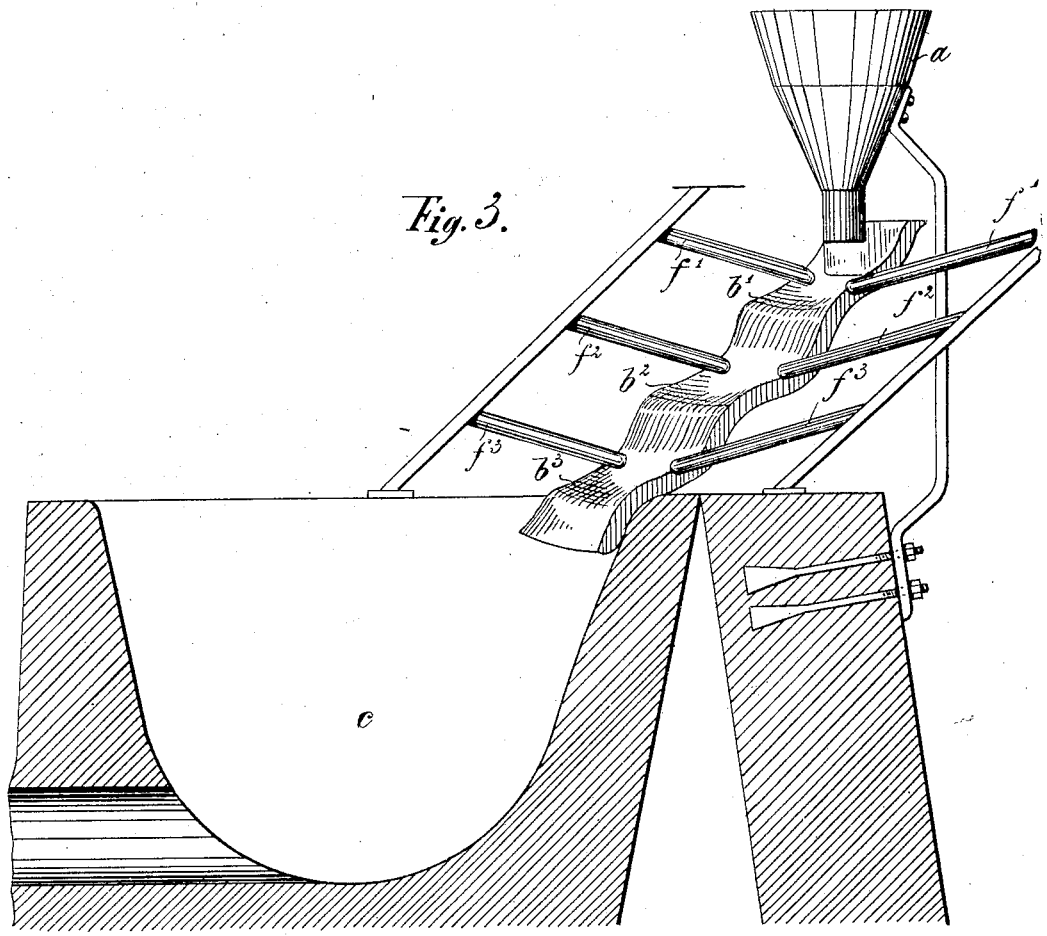

UNITED STATES PATENT OFFICE.

FRANZ HEINRICH BECKER, OF WEVELINGHOVEN, GERMANY.

FURNACE.

SPECIFICATION forming part of Letters Patent No. 664,034, dated December 18, 1900.

Application filed May 3, 1898. Serial No. 679,604. (No model.)

*To all whom it may concern:*

Be it known that I, FRANZ HEINRICH BECKER, a subject of the King of Prussia, residing at Wevelinghoven, in the Kingdom of Prussia, German Empire, have invented certain new and useful Improvements in Furnaces, (for which I have applied for patents in France, dated March 5, 1898; in Belgium, dated March 5, 1898; in Luxemburg, dated March 5, 1898; in England, dated March 22, 1898; in Sweden, dated March 3, 1898; in Norway, dated March 4, 1898; in Denmark, dated March 5, 1898; in Italy, dated March 8, 1898; in Spain, dated March 12, 1898; in Portugal, dated March 12, 1898; in Switzerland, dated March 18, 1898; in Austria, dated March 3, 1898; in Hungary, dated March 4, 1898; in Russia, dated February 23, 1898; in Finland, dated March 11, 1898, and in Germany, dated January 17, 1898,) of which the following is a specification.

My invention relates to furnaces for melting and refining glass frit; and it comprises the details of structure to be hereinafter described, and particularly pointed out in the claim.

Figure 1:
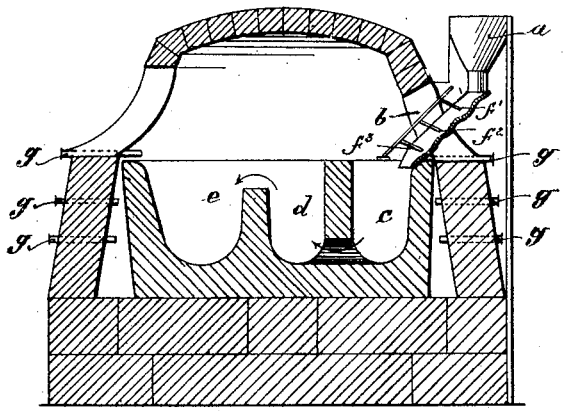
Figure 2:
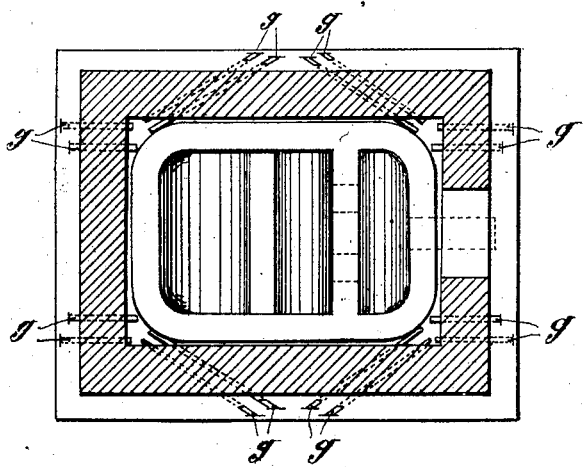

On the drawings, Figure 1 is a vertical section of the furnace. Fig. 2 is a horizontal section of the same, while Fig. 3 is a detail view of a part of the furnace, drawn to an enlarged scale.

The crude materials to be treated are fed into a hopper $a$. From the hopper the materials pass onto a series of hearths $b'$ $b^2$ $b^3$, arranged in the passage $b$. As will be seen, these hearths are arranged one below the other, like a series of steps, and as the material is melted on the first hearth $b'$ it flows down onto the second $b^2$ and from that onto the third $b^3$, from which it runs into the receiver $c$, where the molten glass is thoroughly mixed and worked up to uniformity. From the receiver $c$ the molten mass is run through openings at the base of the partition-wall into the refining-chamber $d$, from which, after it has been perfectly refined, it is passed over the comparatively low partition-wall $e'$ into the working chamber $e$, where it is worked out.

The electric currents are applied to the furnace in the following manner: From the poles of the dynamo (continuous current, alternating or polyphase current) proceed two similar installations, on the one side, to the receiver $c$, the refining-chamber $d$, and the working chamber $e$. The electric heating-arcs can be automatically regulated and controlled in any well-known manner.

In the melting-passage $b$ three pairs of heating-arcs are arranged just above the hearths $b'$ $b^2$ $b^3$. The two upper arcs $f'$ $f^2$ heat the raw material and fuse it, while the arcs $f^2$ $f^2$ and $f^3$ $f^3$ continue the fusing process. Electric heating-arcs are also arranged in the walls of the furnace, as shown at $g$. These heating-arcs can be arranged in the furnace at any suitable position calculated to give the best results.

The furnace is made of fireproof chamotte or magnesite stone.

What I claim, and desire to secure by Letters Patent of the United States, is—

In combination in a furnace, a hopper, a series of hearths receiving the discharge therefrom arranged in step fashion, heating means arranged contiguous to but slightly above each step, a receiver located at the discharge ends of the hearths, a refining-chamber communicating therewith at the bottom of the same, a working chamber and a short partition separating the refining-chamber from the working chamber, substantially as described.

In testimony whereof I have hereunto set my hand in the presence of two witnesses.

FRANZ HEINRICH BECKER.

Witnesses:
 H. HAUCKE,
 WILLIAM H. MADDEN.